Oct. 19, 1943.　　　　　J. R. COX　　　　　2,332,301
BRAKE
Filed Feb. 21, 1940　　　　9 Sheets-Sheet 1

INVENTOR
JEROME R. COX
ATTORNEY

Fig. 4

Oct. 19, 1943.   J. R. COX   2,332,301
BRAKE
Filed Feb. 21, 1940   9 Sheets-Sheet 5

INVENTOR.
JEROME R. COX.
BY
M. W. M'Conkey
ATTORNEY fig. 8 fig. 9

Oct. 19, 1943.   J. R. COX   2,332,301
BRAKE
Filed Feb. 21, 1940   9 Sheets-Sheet 7

Fig. 13

INVENTOR.
JEROME R. COX.
BY
M. W. McConkey.
ATTORNEY.

Fig. 14

Oct. 19, 1943.　　　　J. R. COX　　　　2,332,301
BRAKE
Filed Feb. 21, 1940　　　　9 Sheets-Sheet 9

Fig. 15

INVENTOR
JEROME R. COX
BY
M. W. McConkey
ATTORNEY

Patented Oct. 19, 1943

2,332,301

UNITED STATES PATENT OFFICE 2,332,301

BRAKE

Jerome R. Cox, South Bend, Ind., assignor to Bendix Aviation Corporation, South Bend, Ind., a corporation of Delaware Application February 21, 1940, Serial No. 320,080

2 Claims. (Cl. 188—152)

This specification comprises a description of my invention relating to improvements in brakes and is submitted for the purpose of complying with the statutes of the United States relative to the granting of Letters Patent.

In describing my invention, the device will first be described generally and the main respects in which it constitutes improvements over the prior art will be pointed out. Then the main objects and features of the invention will be stated. Following this, there will be a description of the figures of the drawings. Then a detailed description of the preferred embodiment of my invention will be given and following this a description of the operation will be given. Then there will be given a description of an alternative form also submitted in illustration of my invention. The claims particularly pointing out my invention will follow my specification.

My invention described in this specification relates to brakes and to brake systems for automobiles and specifically to arrangements for insuring safety of hydraulic actuating systems for said brakes. Heretofore, it has sometimes been proposed to separate the hydraulic lines leading to a portion of the brakes from the hydraulic lines leading to other portions of the brakes. So far as I know, all of the prior systems along this line are subject to one or more of the following disadvantages: In some cases such safety systems introduced into the hydraulic brake system, hazards which are not present before the safety system is added. For instance, in some systems a line may be inadvertently blocked even though otherwise the line would be perfectly operative. In other cases, the failure of a seal associated solely with the safety system itself will cause possible failure of the brake system. In other cases, the safety system will not prevent the loss of brakes due to a slow leak. In other cases, it is impossible to bleed the hydraulic system with the safety system attached. In other cases, portions of the line are isolated from the other portions entirely and there is no means for compensating these isolated portions for expansion and contraction of liquid due to temperature changes.

It sometimes happens that a safety system for hydraulic brakes is not effective because there is not proper adjustment of the brake shoes. In a brake system which calls for separation of the brakes into two or more parts, each operative even though another part fails, the movement of the brake shoes necessary to apply the effective brakes must be as small as possible. When part of the brake system fails, a certain amount of pedal travel is used up in closing off that portion of the brake system. Consequently, if the shoes are poorly adjusted, the brakes may not be effective during partial failure even though a safety device is used to cut off the failing portion.

It has also been proposed to provide warning signals effective to advise the operator of failure of a portion of the braking system. However, these warning systems have depended upon the absence of a light or signal and not upon the presence of the signal. It is the intention of my invention to try to eliminate these defects.

One of the objects of my invention therefore is to provide a system of hydraulic brakes which will eliminate the hazard of failure of the entire hydraulic brake system without introducing any additional hazards which might cause failure of the hydraulic brake system due to the safety device itself.

A further object of my invention is to provide a positive warning signal to warn the operator of failure of a portion of the braking system.

An important object of my invention is the provision of an automatic brake shoe adjustment for use with a hydraulic safety system. The safety system is thus made fool-proof, and its efficiency is protected by proper shoe adjustment.

One of the objects of my invention is the provision of a hydraulic braking system having signals adapted to be actuated to indicate a failure of any portion of the braking system.

A further object of my invention is the provision of a master cylinder having separated portions connected to separate brakes so arranged that each of these portions is compensated from a reservoir by a connection therewith, the connection being cut off during brake actuation by a positive valve.

A further object of my invention is the provision of safety means for preventing the failure of the entire hydraulic brake system consequent upon the failure of a portion thereof in combination with means for automatically adjusting the brakes relative to the drum.

A further object of my invention is the provision of a hydraulic master cylinder provided with separate bores which are interconnected when the brakes are released, and when the brakes are being applied with equal pressure, but are so arranged that should pressure drop in one of the lines the pressure of the other line will be effective to operate a valve closing the connection to the line having decreased pressure.

A further object of my invention is the provision of a master cylinder having separated portions one of which is (in the released position of the brakes) connected to a reservoir and the other of which is (in the same position) connected to the first named portion together with means effective upon the initiation of pressure for the application of the brakes to separate the two portions of the master cylinder and to separate the connection between the reservoir and its associated portion of the master cylinder.

One feature of my invention is the design of a hydraulic pressure switch having alternate points of contact, one of which is arranged to be actuated upon increase in pressure and another which is arranged to be actuated upon decrease in pressure.

A further feature of the invention is the provision of an electric circuit so arranged as to actuate one light when pressure is present in either one or both of two switches and so arranged to actuate alternately one or the other of another pair of lights when pressure is present in one switch only.

A further feature of my invention is the provision of a master cylinder having a pair of separated pressure chambers together with means for connecting these chambers to a reservoir when the brakes are released, and having interconnections which are arranged to be eliminated should one of the brake lines lose its pressure and which are arranged to then seal the brake line which loses its pressure.

A further feature is the novel arrangement of master cylinders utilizing my invention and having separated portions for operating different brakes.

A further feature of my invention is the provision of a master cylinder having a single compression chamber, but having outlets connected to different brakes, having means to equalize these outlets and means dependent upon the high pressure in one system of brakes for closing off the connection to other brakes in which the pressure may drop.

Further features and objects of my invention should be apparent from a reading of the subjoined specification and claims and from the showing of the accompanying drawings in which:

Figure 1:
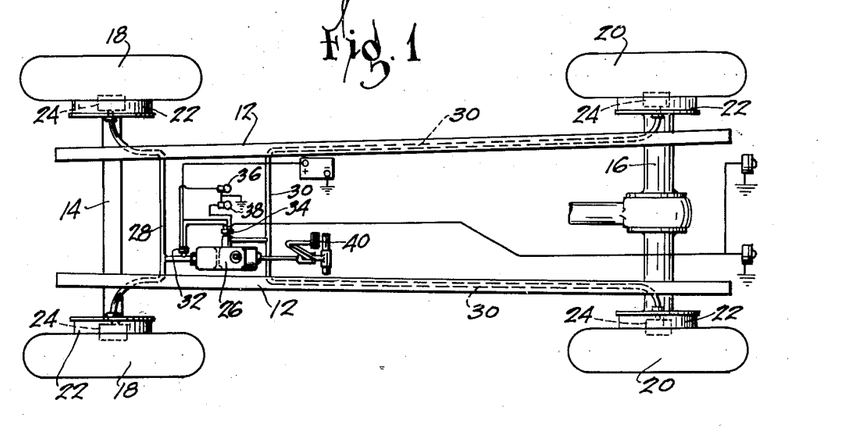
Figure 1 is a schematic plan view of an automobile equipped with a hydraulic brake system constructed according to the disclosure of subsequent Figures 2 to 7, inclusive.

Referring particularly to Figure 1 of the drawings, it may be seen that I have shown the chassis of an automobile provided with frame members 12 and with front axle 14 and rear axle 16 by which the frame members are supported. The front axle is supported by front wheels 18 and the rear axle by rear wheels 20. Each of the wheels is provided with a brake such as 22 arranged to be operated by a wheel cylinder such as 24. The wheel cylinders are connected with a master cylinder 26 by means of a front conduit system 28 and a rear conduit system 30. Hydraulically operated switches 32 and 34 are connected with the conduit system 28 and 30 respectively and they are arranged to control signal lights 36 and 38. The master cylinder 26 is arranged to be operated by a pedal 40.

Figure 2:
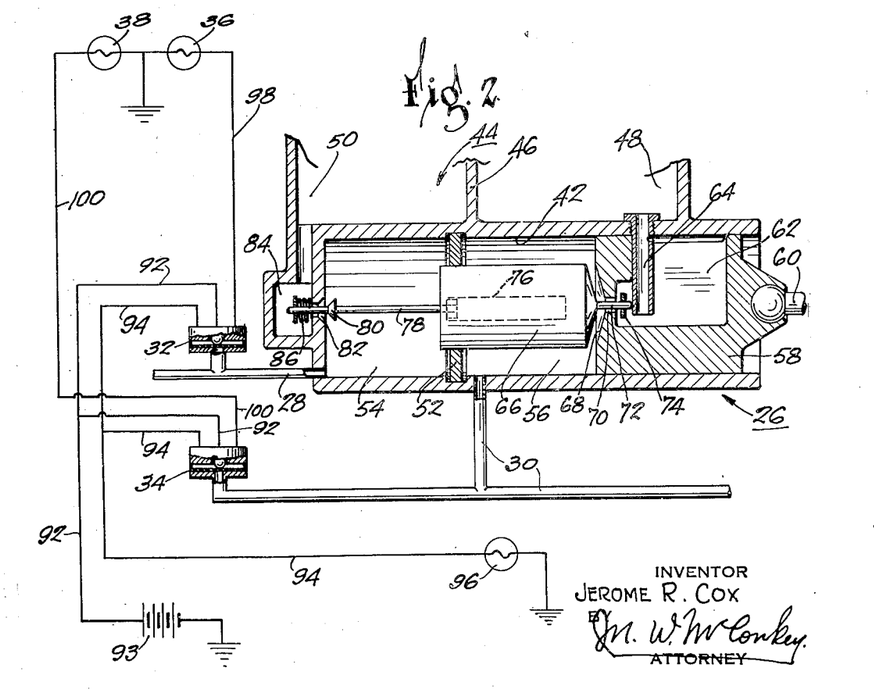
Figure 2 is a schematic showing of a master cylinder such as that which is used in Figure 1.

More details of the master cylinder, switches, and signals are shown diagrammatically in Figure 2 wherein it may be seen that the master cylinder 26 comprises a bore pressure chamber 42 and a reservoir, generally designated 44, which is divided by a partition 46 into two portions 48 and 50. Similarly the pressure chamber 42 is divided into two portions 54 and 56 by a partition 52 which may be formed of rubber or some similar material so as to seal the forward portion 54 from the rearward portion 56 and vice versa. The partition 52 is allowed a slight floating movement in the direction the piston 66 is moving. It will be noted in Figures 2 and 3 that the outer curved surface of the partition fits into a small niche in the wall of the master cylinder 26, a slight lateral clearance being allowed between the flat surfaces of the partition and the side walls of the niche. The pressure chamber 42 is provided with a piston 58 within the rearward portion 56, the said piston being arranged to supply pressure to liquid in said rearward portion. The piston 58 is arranged to be operated by the pedal 40, shown in Figure 1, by means of a piston rod 60 and is formed with a recess 62 into which there extends a fill tube 64 which also forms a stop for the piston and a valve control subsequently to be described.

Extending through the partition 52 is a plunger 66 which has a smaller diameter than the piston 58 and which normally extends both into portion 54 and into portion 56 of the master cylinder.

The forward end of the piston 58 is formed with a valve seat 68 and with a central opening 70; the rearward end of the plunger 66 is formed to fit the seat 68 and is provided with an extension 72 which extends through the opening 70. The rear end of the extension 72 is at times arranged to contact with the tube 64 to hold the plunger from its seat 68 and thus allow passage of liquid through opening 70 from the recess 62. The extension 72 is also provided with a nut 74 so that the extension 72 may not be drawn out of the opening 70. Thus it may be seen in the released position of the piston 58 and plunger 66, liquid may flow freely from the portion 48 of the reservoir 44 through the tube 64 into the recess 62 and through the opening 70 into the portion 56 of the pressure chamber 42.

The plunger 66 is provided at its forward end with a central recess 76 within which there is carried the rear end of a valve stem 78 provided with a valve 80 arranged at times to close an opening 82 leading to a chamber 84 connected with the portion 50 of the reservoir 44. A spring 86 is arranged to urge the valve 80 towards its seat. However, as may be seen, the valve 80 is held from its seat when the plunger 66 is returned to the released position as shown in Figure 2 so that liquid may flow freely from the portion 50 of the reservoir 44 through the recess 84 and the opening 82. As may be understood, the conduit 28 leads to the wheel cylinder for the forward brakes from the portion 54 and the conduit 30 leads to the rear brakes from the portion 56. Interposed in the conduit 28 is the stop-light switch 32 and interposed in the conduit 30 is the stop-light switch 34. More detailed description of these stop-light switches will be given later. Connected to the switches 32 and 34 are battery wires 92 leading to a battery 93. Also connected to both switches are wires 94 which lead through the stop-light 96 and thence to a ground connection. Also connected respectively to the switches 32 and 34 are the indicating wires 98 and 100. The indicating wire 98 leads through the indicating light 36 and thence to a ground connection and the indicating wire 100 leads through the indicating light 38 to a ground connection.

Figure 3:
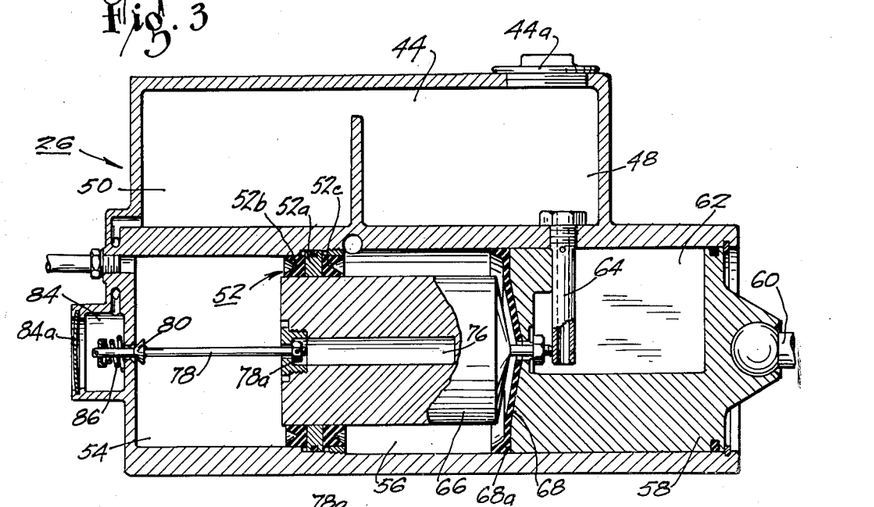
Figure 3 is a sectional view of a master cylinder constructed according to the arrangement shown schematically in Figure 2.

In Figure 3, there is shown a more exact representation of the master cylinder 26. The various parts are given the same numerals as the corresponding parts of Figure 2. It may be seen that the partition 52 comprises a metallic ring 52a against which there are positioned annular cups 52b and 52c facing in opposite directions and sealing against the passage of liquid in both directions. It may be further seen that the rod 78 is provided with a nut 78a, which is secured to the rod 78 within the recess 76 and cooperates with the rod 78 in holding the valve 80 from its seat. The forward end of the chamber 84 is closed by a disk 84a. The seat 68 is provided with a sealing cup 68a. The reservoir 44 is closed by a cap 44a.

Figure 4:
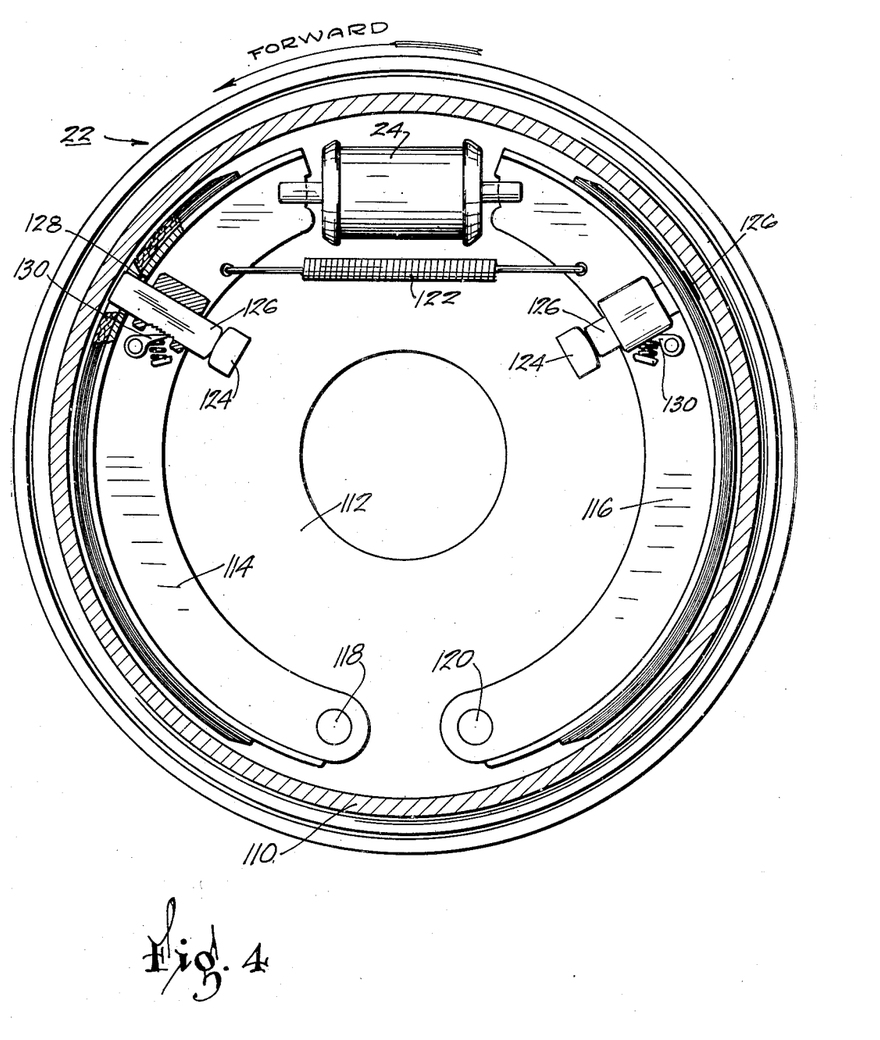
Figure 4 is a sectional view of one of the brakes shown in Figure 1.

In Figure 4 one of the brakes 22 is shown in detail. It may be seen that the brake 22 comprises a brake drum 110 which is secured to the rotatable wheel 18 or 20. A backing plate 112 is secured to the axle 14 or 16 and carries a pair of shoes 114 and 116 anchored as at 118 and at 120. The shoes are arranged to be spread by the wheel cylinder 24 and will normally be returned to their released position by a retracting spring 122. Secured to the backing plate 112 are a pair of stops 124 with each of which there is arranged to contact an adjustable member 126 which extends through a slot 128 formed in the associated brake shoe. The adjustable member 126 bears at its opposite end upon the brake drum when the shoe is applied as in braking and thus is adjusted inward of the shoe as the lining wears. It is held in its adjusted position by means of a pawl 130. Thus it may be seen that as the lining wears the member 126 is adjusted inward during brake applications and then locked so that the return position of the shoe is adjusted outward to maintain a uniform clearance of the shoe in released position. It may be further seen that by this arrangement adjustment of the shoe in case the brake drum expands due to heat is avoided, this being true because the adjustment of the brake shoe depends upon the length of extension of the member 126 beyond the outer edge of the brake shoe, not upon the clearance between the brake shoe and brake drum.

The operation of the master cylinder shown in Figures 2 and 3 in actuating the brakes of Figure 4 is as follows. It will be understood, first of all, that in released position of the brakes the portion 48 of the reservoir communicates freely with the chamber 56 of the master cylinder, and the portion 50 of the reservoir communicates freely with the chamber 54 of the master cylinder. When the operator depresses the brake pedal, he moves the rod 60 causing the piston 58 to move leftward. As soon as face 68 of the valve 58 contacts the surface of the piston 66, the opening 70 is closed and fluid can no longer pass between chamber 56 and the reservoir. The further leftward movement of piston 58 therefore forces pressure liquid through the conduit system 30 to apply the rear brakes.

Once pistons 66 and 58 are in contact, piston 66 will be forced leftward by the applying stroke of piston 58. Up to this time, the valve 80 has been held from its seal by the engagement of enlarged right end of its rod 78 with the interior of piston 66. As soon as piston 66 moves sufficiently to the left the valve 80 is allowed to close under the influence of the spring 86. Communication between the reservoir and chamber 54 of the master cylinder is now cut off, and the further leftward movement of piston 66 creates pressure in chamber 54, and forces pressure liquid through the conduit system 28 to apply the front brakes. It will be noted that valves 68 and 82 are both closed by positive acting valves, i. e., valves which are sealed after closing by the applied pressure, and it will also be noted that the sliding of a resilient seal over a port in the cylinder wall is avoided, thus eliminating the danger of scuffing and tearing the sealing cup, which danger is present in most of the prior art cylinders known to applicant.

A desired ratio of braking between front and rear brakes may, as evident from the present disclosure, be established by providing pistons 58 and 66 having the necessary relative sizes.

The two chambers 54 and 56, and consequently the front and rear braking systems are effectively sealed from each other by the partition 52. Therefore, should either of the breaking systems become inoperative, the failure of such system would not prevent the piston connected with the operative system from fully applying the brakes connected with it. It will be seen, therefore, that applicant has provided a single bore master cylinder which actuates through separate connections two separate systems of brakes, the said systems being entirely disconnected from one another and each system being adapted to operate regardless of the condition of the other system.

The wheel brake of Figure 4 may be considered to be any one of the four brakes of Figure 1, inasmuch as the operative parts of each wheel and brake assembly are the same. The pressure fluid, which I have spoken of in describing the master cylinder enters the wheel cylinder 24 from whichever conduit, 28 or 30, is connected thereto. The pressure acting on the pistons within the wheel cylinder moves the rods to spread apart the shoes 114 and 116 thus forcing them into frictional engagement with the brake drum 110 and decreasing the speed of rotation thereof.

Figure 5:
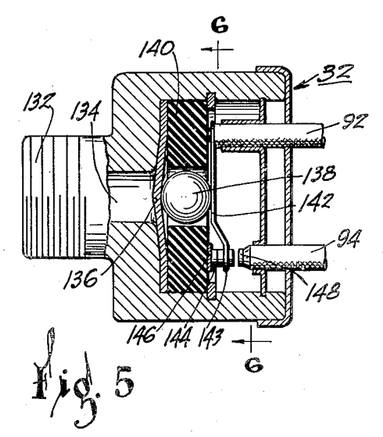
Figure 5 is a sectional view of one of the switches shown more or less schematically in Figure 2.
Figure 6:
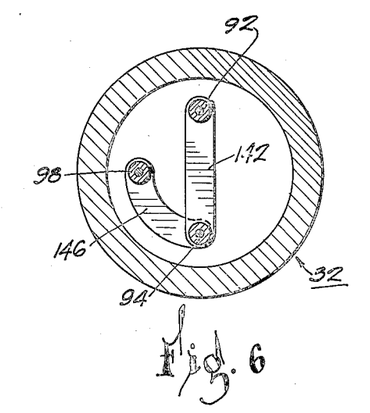
Figure 6 is a sectional view of the switch shown in Figure 5 taken substantially on the line 6—6.

In Figures 5 and 6 the detail of the switch 32 is shown. Inasmuch as the switch 32 is exactly like the switch 34, separate description of the latter switch will be unnecessary. The switch is provided with a threaded projection 132 which is secured in the conduit system 28 and by reason of a bore 134 allows the pressure of the system 28 to act upon a diaphragm 136. The diaphragm contacts a ball 138 which is guided by an annular insulating member 140. The ball 138 also bears upon a spring contact member 142 secured at one end to the terminal of battery wire 92. The opposite end of the contact member 142 is arranged when all pressure in the system is released to contact with contact element 144 connected by an arcual strip 146 with indicating wire 98 (note Figure 6). Under normal released pressure, which is the pressure maintained by the hydrostatic head of the fluid the end 143 of element 142 is moved away from the contact element 144 but is not moved into contact with contact element 148. However, when brake applying pressure is exerted on the fluid in the system 28 the pressure, acting through the diaphragm 136, the ball 138 and the strip 142, moves the end 143 into contact with the element 148 which is connected with the stop-light wire 94.

Figure 7:
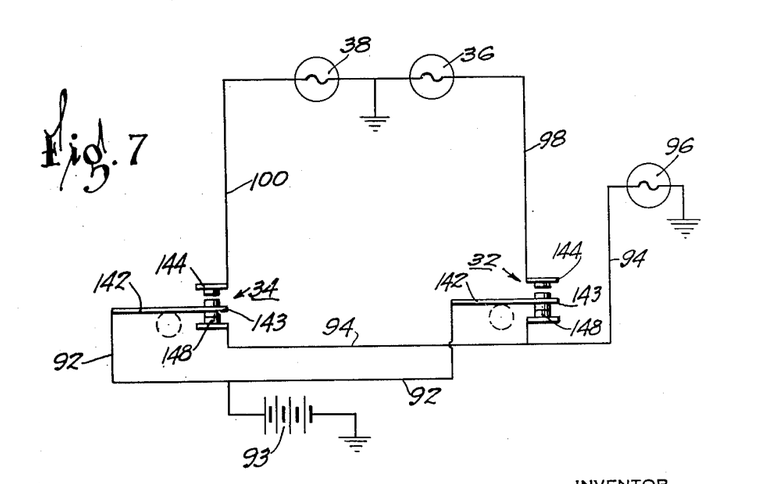
Figure 7 is a diagram arranged to show the electrical circuit and amplify the showing thereof in Figure 2.

In Figure 7 the electrical circuit in Figure 2 is shown separate from the rest of the system and the same numerals are used as in Figures 2 and 5. It will be noted that in Figure 7 the elements 143 are shown contacting the elements 148 which is the position they will take when the brakes of the vehicle are being applied.

Operation of the electrical signal circuit shown in Figures 2, 5 and 7, and which includes the switch of Figures 5 and 6 will now be described. As pointed out the hydrostatic pressure prevailing in the brake system associated with the particular switch in question will be sufficient to maintain the element 143 out of contact with the element 144 as long as a normal amount of liquid remains in the system. At the same time, there will not be sufficient pressure when the brakes are released to force the element 143 into contact with the element 148. Therefore, if the brakes are released and there is no deficiency of liquid in either system of brakes, neither signal 36, nor signal 38, nor stop-light 96 will be lighted.

If the pressure in either braking system fails, the switch associated therewith will allow its element 143 to contact its element 144, thus closing a circuit from the battery 93 through wire 92, lever 142, element 146 and wire 98 leading either to signal 36 or its signal 38, depending upon which system of brakes, front or rear, has felt a loss of pressure. Thus the operator will be apprised of a failure in the hydraulic system, and he will further be shown which set of brakes has failed.

If the operator fully applies the brakes and there is fluid therein, the pressure in the switch will be sufficient to move element 143 against element 142, thus closing the circuit and connecting battery wire 92 to stop-light wire 94 to light the stop-light 96. As long as either of the brake systems are working, the stop-light will be actuated whenever the brakes are applied.

Figure 8:
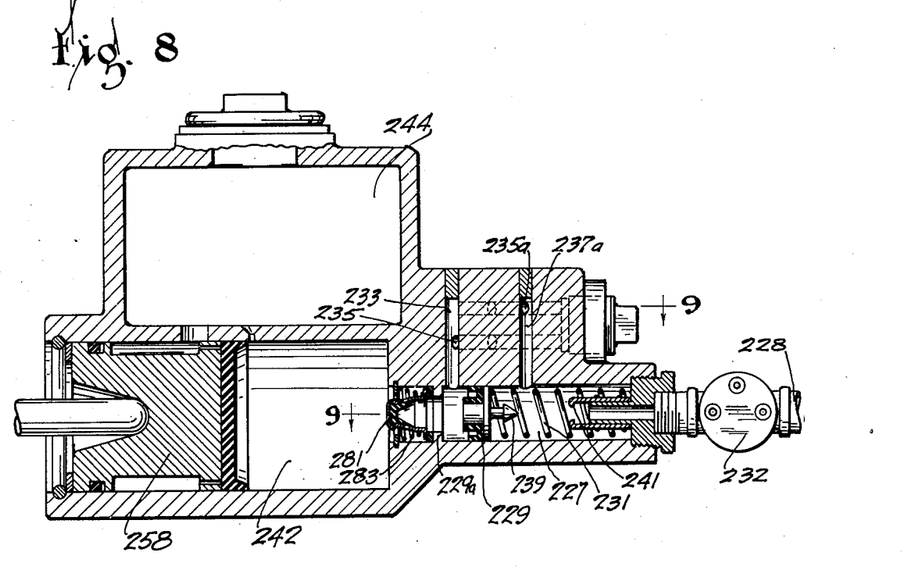
Figure 8 is a view in section showing a master cylinder which may be considered a modification of the master cylinder shown in Figure 3.
Figure 9:
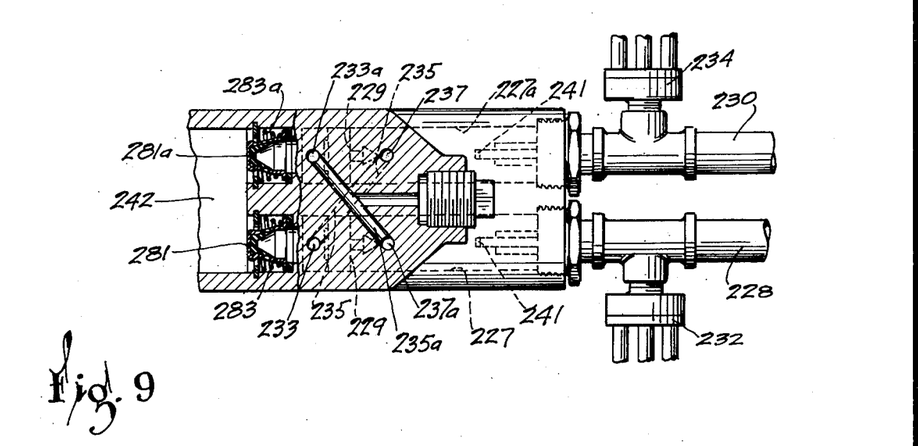
Figure 9 is a fragmentary sectional view taken substantially on the line 9—9 of Figure 8.

In Figure 8, a master cylinder which may be considered a modification of the master cylinder shown in Figure 3 is disclosed. Therein the reservoir 244 supplies fluid to the cylinder bore 242, in which there is positioned the master cylinder piston 258. There are two outlets from the bore 242, which are controlled by the pressure valves 281 and 281a (see Figure 9). These pressure valves 281 and 281a are connected respectively to bores 227 and 227a and allow free passage of liquid from the bore 242 into the smaller bores 227 and 227a. From the smaller bore 227, liquid flows into the front braking system 228 and from bore 227a liquid flows into the rear braking system 230. The system 228 is provided with a pressure switch 232 corresponding to the switch 32 and system 230 is provided with a pressure switch 234 corresponding to the switch 34. The valves 281 and 281a, while arranged to allow substantially free passage of liquid forward from the bore 242 to the bores 227 and 227a, so restrict rearward passage that the liquid ahead of these valves is always maintained under pressure corresponding to the strength of springs 283 and 283a associated with the valves 281 and 281a.

Within each of the bores 227 and 227a, there is provided a safety piston 229 normally urged to its rearward position as shown against a shoulder 229a by a spring 231. Liquid may pass to the rearward of the piston 229 substantially freely, but may not pass the piston in a forward direction. In their rearward positions, the pistons 229 block vertical bores 233 and 233a. The bore 233 is connected by a diagonally extending crossbore 235 with a forwardly placed vertical bore 237. The bore 233 leads into the pressure chamber 227 and the bore 237 leads into the pressure chamber 227a. Similarly a vertical bore 233a leads into the pressure chamber 227a and is connected by diagonal horizontal bore 235a with a vertical bore 237a leading into the pressure chamber 227.

Thus should the hydraulic brake pressure systems be operating normally equal pressures on the pistons 229 will move those pistons forward so that the bores 233 and 233a are uncovered and the liquid will by-pass the pistons 229 and apply the brakes. However, should one of the systems 228 or 230 fail, the pressures ahead of the corresponding safety piston 229 being so much lower than the pressures behind will cause that piston to move forward to block one of the bores 237 or 237a while the other safety piston 229 will be held back by the pressures ahead of it. When the piston 229 has covered one of the ports 237 and 237a no further liquid may by-pass and full pressure exerted on the piston will force it forward so that the projection 239 will be engaged by the fingers 241 and the piston will be locked in its forward position thus preventing any further liquid from entering the associated system. Thereafter all of the braking force exerted will be applied to the other undamaged system and the brakes either at the front of the car or at the rear thereof will be retained. At the same time, the indicating system will show to the driver that one set of his brakes is not working properly and will show also which set is damaged.

Figure 10:
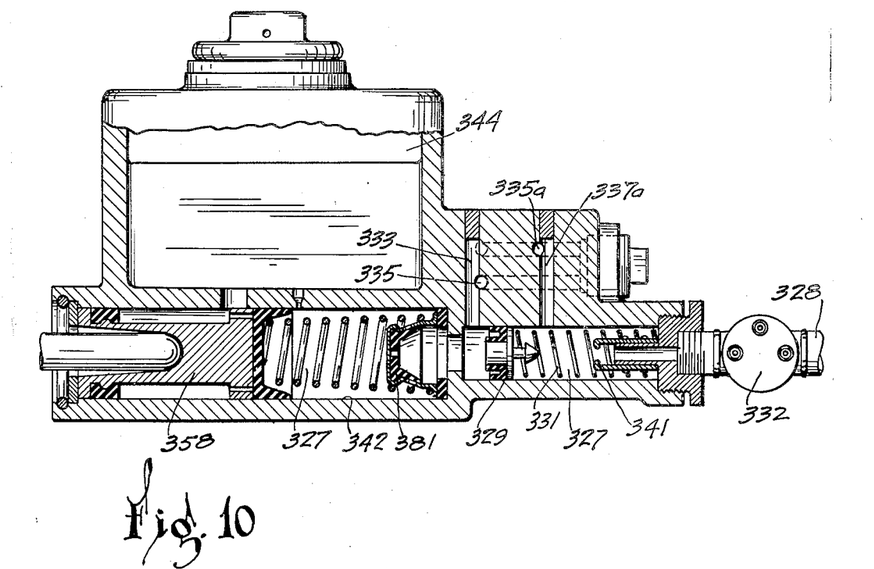
Figure 10 is a sectional view showing another modified form of a master cylinder somewhat similar to that shown in Figure 8.

In Figure 10, there is shown a system similar to that shown in Figure 8. Therefore, similar numerals with the addition of 100 are used to indicate the various parts. However, it may be noted that the valve 381 is in the bore 342. The valve 381a controlling the pressure chamber 327a is positioned in a corresponding bore 342a and in this corresponding bore 342a is a piston corresponding to the piston 358. Thus the front and rear systems are further isolated in that each has its own master cylinder and master cylinder piston. Both of the separate master cylinders are supplied by the reservoir 344 and the two systems are interconnected as in Figure 9, so that pressures are balanced by the arrangement of the bores 333, 337a, 335, and 335a (all shown), and bores (not shown) similar to bores 233a and 237.

Figure 11:
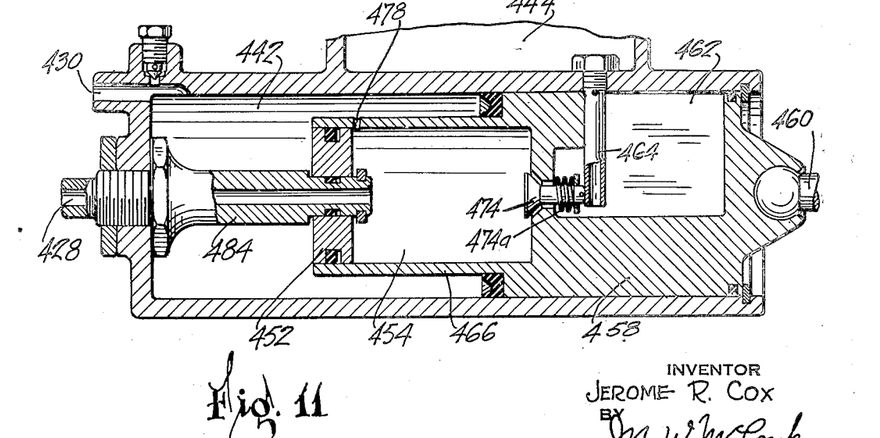
Figure 11 is another modified form of master cylinder which may be substituted for the master cylinder shown in Figure 3, the showing of Figure 11 being a fragmentary sectional view.

In Figure 11, a master cylinder structure more nearly like that shown in Figures 2 and 3 is shown. Corresponding numerals with the addition of 400 to those used in Figures 2 and 3 are applied to the structure of Figure 11. However, it may be seen that the piston 458 serves for both the forward system of brakes 428 and the rear system of brakes 430. It is provided with a forward extension 466 and in the released position as shown liquid may flow from the reservoir 444 through the tube 464 into the space 462, and thence past the valve 474 into the hollow portion 454 of the extension 466. In the released position, as shown, liquid may also flow from this hollow portion 454 through a port 478 into pressure chamber 442. A floating piston 452 closes the forward end of the portion 454 and is supported on a hollow conduit 484 which limits the forward and rearward movement of the partition 452. When the piston 458 is moved forward to apply the brakes, the spring 474a causes the valve 474 to close and all liquid ahead of that valve is thus trapped. The tube 484 prevents the partition 452 from moving forward with the extension 466 and thus the port 478 is cut off so that liquid is trapped in both of the pressure chambers 442 and 454. The liquid which is trapped in the pressure chamber 454 is forced out through the tube 484 to the front brake system 428 by reason of the relative movement of the extension 466 and the partition 452. The liquid trapped in the pressure chamber 442 is forced out to the rear brake system 430 by reason of the movement of the piston 458 forward.

Figure 12:
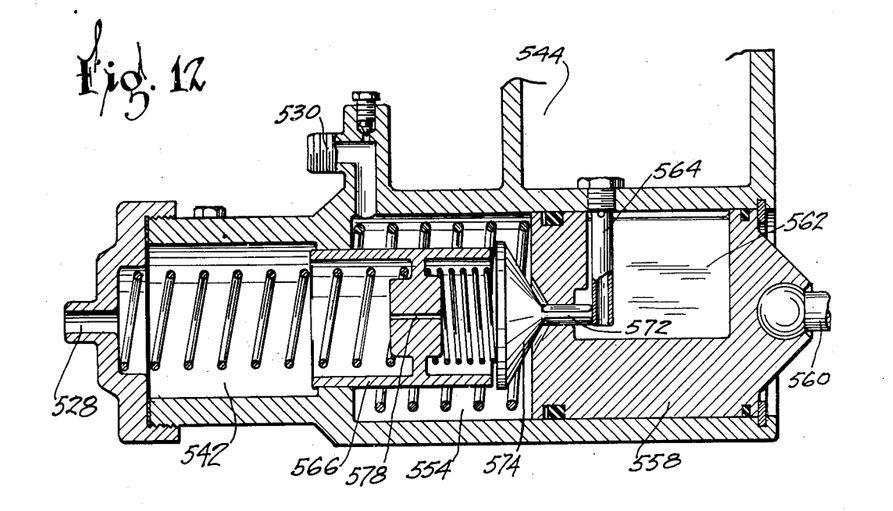
Figure 12 is a fragmentary sectional view of another master cylinder somewhat similar to those shown in Figures 3 and 11.

In Figure 12, another master cylinder very similar to that shown in Figure 3 is shown and corresponding parts are indicated by the same numerals with the addition of 500. However, the valve 574, which in the normal position allows passage of liquid from the reservoir 544, the tube 564, the recess 562, around its stem into the pressure chamber 554 and thence through a port 578 into the pressure chamber 542, is arranged by reason of seating both on the piston 558 and the piston 566 when the pressure is applied to cut all communication both between the chamber 562 and the chamber 554 and also between the chamber 554 and the chamber 542. The chamber 554 is connected as shown to the rear brake system 530 and the chamber 542 is connected to the forward brake system 528. As piston 558 moves to the left, it forces the liquid in chamber 554 through conduit 530 to apply the rear brakes. At the same time, the element 574 is pushed leftward by piston 558 and applies pressure to the liquid in chamber 542, forcing it through conduit 528 to the front brakes.

Figure 13:
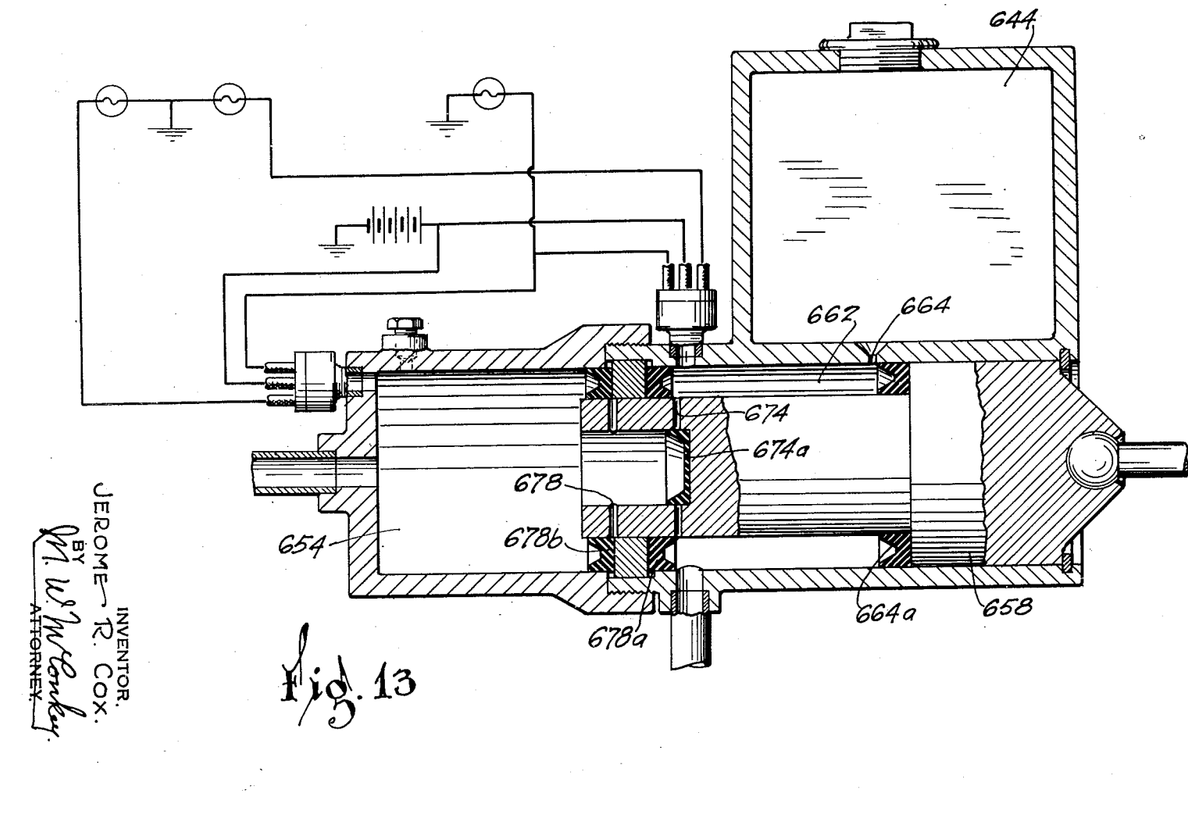
Figure 13 is a diagrammatic view showing a master cylinder of modified form somewhat similar to the master cylinder shown in Figure 11 and showing diagrammatically the indicator circuit.

In the alternative system shown in Figure 13, the reservoir 644 connects when the brakes are released through a port 664 with the annular space 662 around the piston 658. The pressure chamber 654 is maintained at the same pressure as the chamber 662 for the reason that liquid may flow forward through port 674 past sealing cup 674a and may flow rearward through port 678 past sealing cup 678a. However, when the piston 658 is moved forward, it immediately cuts off the port 664, so that no liquid may flow from the chamber 662, the port 664 being sealed by the cup 664a. No liquid may flow forward through the port 674 because that port immediately becomes sealed by the cup 678a; neither may liquid return rearward through port 674 because that port is then sealed by cup 674a. Liquid may not flow forward through the port 678 because that port remains sealed by the cup 678a and may not flow rearward through port 678 because after movement that port is sealed by the cup 678b. The pressure liquid in chambers 654 and 662 will thus be forced by the piston 658 to apply the front and rear brakes respectively, the two brake systems being effectively sealed from one another after applying movement is begun.

Figure 14:
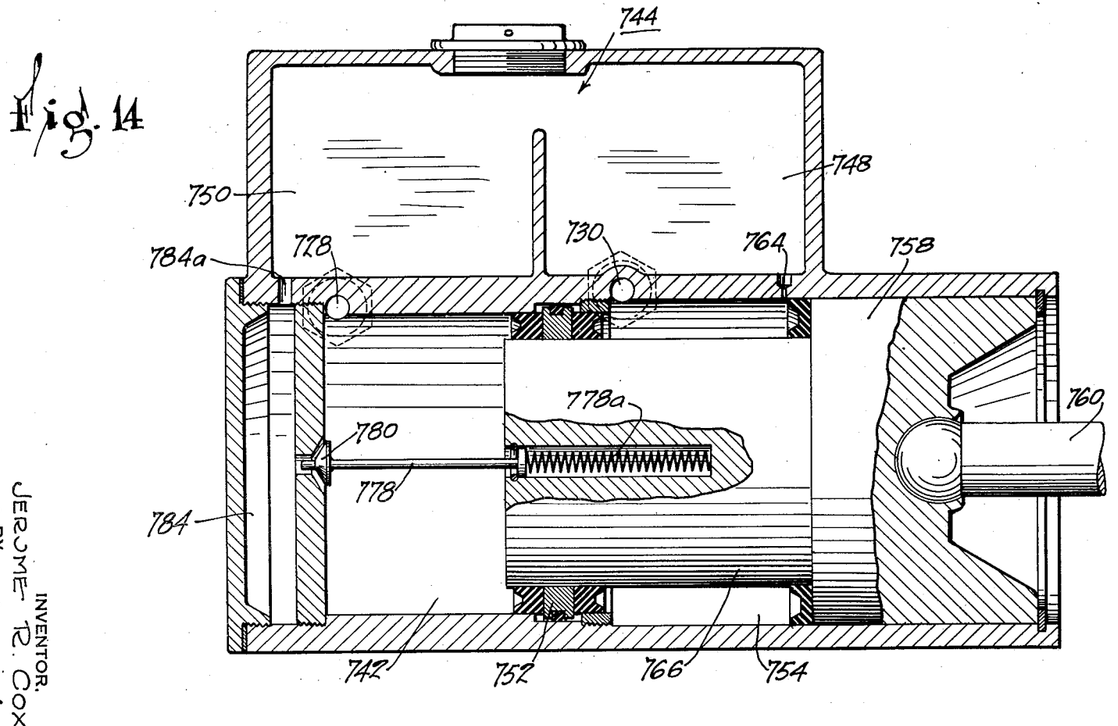
Figure 14 is a sectional view showing another modified form of master cylinder which might be substituted for that shown in Figure 3.

The arrangement shown in Figure 14 is very similar to that shown in Figure 3 and like parts will be indicated by the same numerals with the addition of 700. However, in the normal released position the pressure chamber 754 is compensated because the port 764 allows substantially free passage of liquid from the compartment 748 of the reservoir 744. The pressure chamber 742 is at that time compensated from the portion 750 of the reservoir 744 by reason of the passage 784a leading into the chamber 784 and thence past the valve 780. Immediately that the piston is moved forward, the port 764 is cut off and the valve 780 is allowed to move to its seat under the pressure of the spring 778a.

Figure 15:
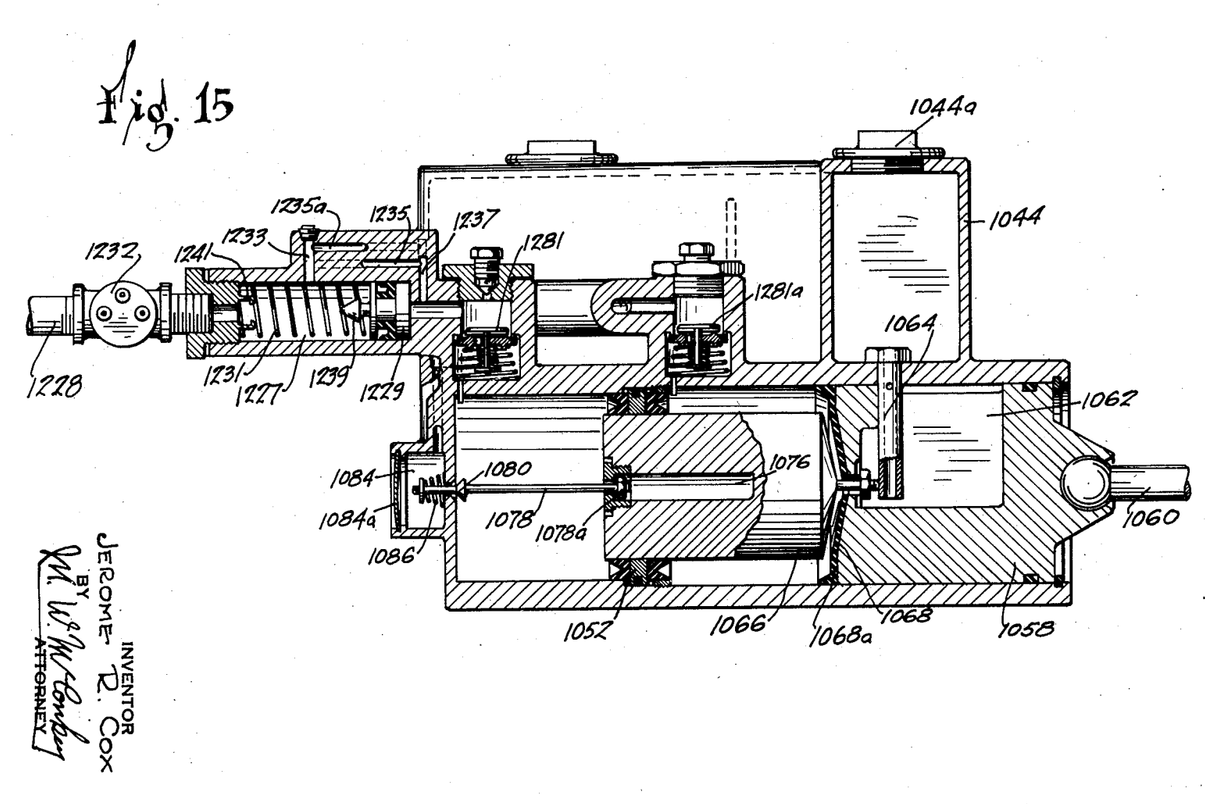
Figure 15 is a sectional view of a master cylinder somewhat similar to that shown in Figure 14 but provided with safety separating means.

In the arrangement shown in Figure 15, there are combined portions of the arrangements shown in Figures 3 and 8. The same numerals are used as are used in said Figures 3 and 8 with the addition of 1000. The arrangement shown in Figure 15 is such that it may be more practical for manufacture and use. Differential diameter pistons 1058 and 1066 are reciprocable respectively in large and small diameter chambers. The large diameter piston 1058 is adapted to force fluid under pressure past check valve 1281a into one barrel of a two barrelled fluid pressure device which has floating pistons, as 1229, reciprocable in each barrel, and arranged to at times cut off communication with one of the motor units. The small diameter piston 1066 is adapted to force fluid under pressure past check valve 1281 into the other barrel of the fluid pressure device. As is the case in Fig. 8, the floating pistons are controlled by having the pressure created in one chamber of the master cylinder balanced against the pressure created in the other chamber of the master cylinder. If pressure in either of the chambers should fail, the reciprocable floating piston would cut off communication between the master cylinder and that part of the system which failed.

Figure 16:
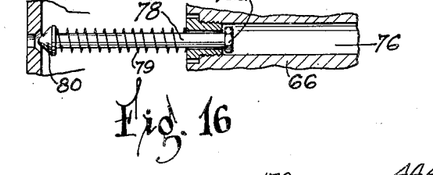
Figure 16 is a fragmentary sectional view showing a modified detail of the arrangements which might be used with a master cylinder similar to those shown in Figures 14 and 15.

In Figure 16, a modification of the arrangement shown in Figure 3 is disclosed in which the spring 79 extends between the forward end of the piston 66 and the valve 80 instead of being positioned on the forward extension of the rod 78.

In all of the modifications shown, the brakes, after being applied, are released, in a manner well known to the art (by the force of retracting springs provided to return the brake pedal and the pressure producing pistons to their normal brake released positions.

It is to be understood that the above described embodiments of my invention are for the purpose of illustration only and various changes may be made therein without departing from the spirit and scope of the invention.

I claim:

1. In a fluid pressure braking system, a plurality of brake actuating units, a plurality of conduits each connected to a separate actuating unit, and a pressure producing device having a plurality of bores each connected to one of the said conduits, means for supplying pressure liquid through said bores to said conduits, and means associated with said bores for disconnecting said bores from said conduits, said means being responsive to a pressure differential between one and another of said bores.

2. In a fluid pressure braking system, a plurality of brake actuating units, a plurality of conduits each connected to an actuating unit, and a pressure producing device having a plurality of bores each connected to one of the conduits, means for forcing liquid under pressure through the bores to their respective conduits, and floating pistons reciprocable in the bores adapted to disconnect either bore from its respective conduit whenever there is a substantial pressure differential between one and another of the bores, the conduit which is disconnected from its bore being the conduit in which the lower pressure prevails.

JEROME R. COX.